UNITED STATES PATENT OFFICE.

BÉLA SZILARD, OF PARIS, FRANCE, ASSIGNOR TO SAID BÉLA SZILARD AND HENRY BERGERAT, OF PARIS, FRANCE.

PROCESS OF SEPARATING MERCURY FROM POOR ORES BY ELECTROLYSIS.

980,364.  Specification of Letters Patent.  Patented Jan. 3, 1911.

No Drawing.  Application filed June 22, 1910.  Serial No. 568,296.

*To all whom it may concern:*

Be it known that I, BÉLA SZILARD, chemist, resident of Paris, France, have invented new and useful Improvements in Processes for Separating Mercury from Poor Ores by Electrolysis, which improvements are fully set forth in the following specification.

Hitherto mercury has been obtained only by a method of metallurgical treatment, which process was economical only with rich ores.

For extracting mercury from poor ores, it has already been suggested to lixiviate the ores by means of sodium sulfid, but the process in question was never worked, owing to the high cost of the substance in question, and partly for the reason that mercury dissolved in a solution of sodium sulfid cannot be submitted to electrolysis without a considerable loss of current. In fact, in the course of electrolysis there take place secondary reactions which absorb a considerable portion of the current.

The process according to this invention enables electrolysis to be effected in an easy and cheap manner. This process consists in using a lixiviating agent, a mixture consisting of a hot solution of sodium chlorid and of calcium sulfid obtained as a by-product in the manufacture of soda by the Leblanc process, or of other calcium sulfids rendered alkaline by oxid of calcium. The tepid mixture is added to the finely crushed ores and after having left it to stand for two days, a current of hot air is sent through this mixture from below. The hot air reheats to a certain extent the solution, which facilitates the dissolving of the mercury, and moreover, owing to the mixing action of the said air, it serves the same purpose. But the most important object of the hot air current consists in it converting calcium sulfid into thiosulfate of calcium which is deposited with the ores. The liquid discharged contains mercury, not in the form of a sulfid, but in the form of a double salt solution (mercury and sodium chlorid) which can be submitted to electrolysis with an insignificant loss of current, that is to say, practically speaking, without loss of current. With this process, a portion of any silver that may also be contained, is also dissolved.

In order to separate mercury from any silver that may be there, it is possible to use in a well-known manner suitable metal plates instead of the electric current. It must be further pointed out that lixiviation can be effected more rapidly and with a maximum effect in an autoclave boiler at a pressure of 4 atmospheres and at a suitable temperature.

Claim.

1. The herein described process for recovering mercury from poor ores, which comprises treating finely divided ore with a lixiviating agent comprising a mixed solution of sodium chlorid and calcium sulfid, and then subjecting the solution to electrolytic action.

2. The herein described process for recovering mercury from poor ores, which comprises mixing finely divided ore with a lixiviating agent comprising a combined solution of sodium chlorid and calcium sulfid, allowing the mixture to stand for a suitable length of time, then blowing a current of heated air through the mixture, and finally drawing off the solution and separating the mercury therefrom.

3. The herein described process of recovering mercury from poor ores, which comprises; first, mixing the finely crushed ore with a lixiviating agent comprising a combined solution of sodium chlorid and calcium sulfid; second, allowing such mixture to stand for a suitable length of time; third, blowing through said mixture a current of heated air, whereby the calcium sulfid is oxidized; and fourth, drawing off the solution and subjecting it to electrolytic action.

4. The herein described process of recovering mercury from poor ores, which comprises; first, mixing the finely crushed ore with a lixiviating agent comprising a combined solution of sodium chlorid, calcium sulfid and calcium oxid; second, allowing such mixture to stand for a suitable length of time; third, blowing through said mixture a current of heated air, and fourth, drawing off the solution and subjecting it to electrolytic action.

In testimony whereof I have signed this specification in the presence of two subscribing witnesses.

BELA SZILARD.

Witnesses:
GASTON DEMOGET,
H. C. COXE.